Aug. 28, 1934.   O. E. TRAUTMANN   1,971,434
ATTACHMENT FOR LENS MOUNTS
Original Filed May 26, 1931
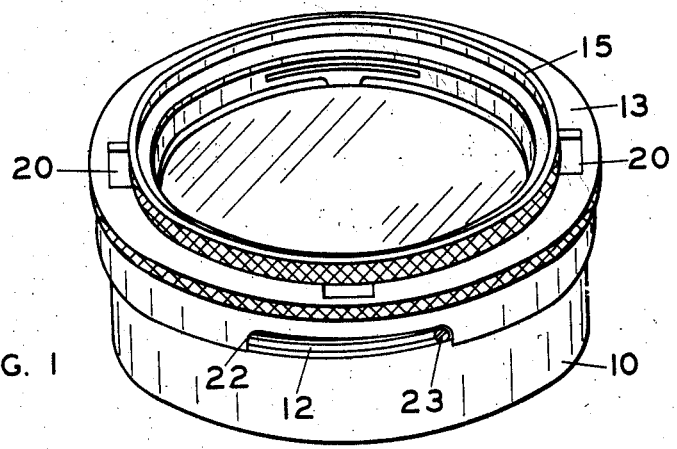
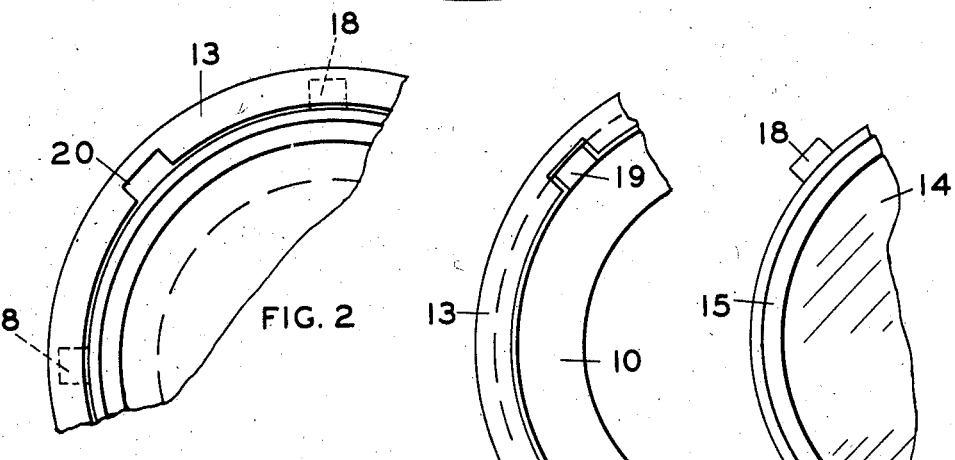
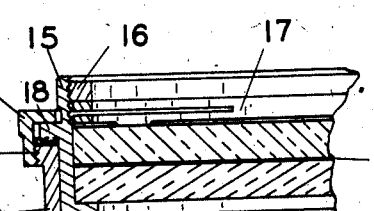
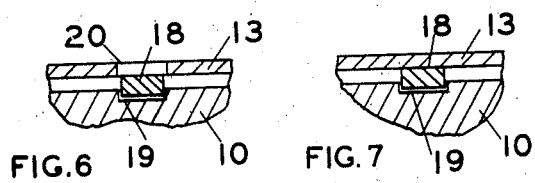
OTTO E. TRAUTMANN
INVENTOR
BY *G. A. Ellestad*
ATTORNEY Patented Aug. 28, 1934

1,971,434

UNITED STATES PATENT OFFICE 1,971,434

ATTACHMENT FOR LENS MOUNTS

Otto E. Trautmann, Irondequoit, N. Y., assignor to Bausch & Lomb Optical Company, Rochester, N. Y., a corporation of New York Application May 26, 1931, Serial No. 540,097
Renewed July 19, 1934

5 Claims. (Cl. 95—81.5)

This invention relates to photographic cameras and more particularly it has reference to means for attaching light modifying devices, such as auxiliary lenses or filters, to a lens mounting.

One of the objects of my invention is to provide an improved means for attaching light modifying devices to a lens mounting. Another object is to provide means whereby color filters or auxiliary lenses may be easily and quickly secured to or detached from a lens mounting. Still another object is to provide means whereby light modifying devices may be detachably secured to a lens mounting and firmly locked in position when secured thereto. Other objects and advantages reside in certain novel features of construction, arrangement and combination of parts as will hereinafter be more fully described and pointed out in the appended claims.

Referring to the drawing:

Fig. 1 is a perspective view of a color filter attaching means embodying my invention.

Fig. 2 is a fragmentary top plan view of same showing the filter mount in locked position.

Fig. 3 is a fragmentary top plan view of the attaching ring without the filter mount.

Fig. 4 is a fragmentary top plan view of the filter mount.

Fig. 5 is a fragmentary sectional view of the attaching ring and filter mount.

Figs. 6 and 7 are fragmentary views showing details of my device in unlocked and locked positions, respectively.

One embodiment of my invention is illustrated in the drawing wherein 10 indicates a barrel or attaching ring having threads 11 by means of which it is secured to a cooperating threaded portion on a camera lens mounting. The ring 10 also has a threaded portion 12 adapted to cooperate with a threaded locking ring 13. A color filter assembly 14 is secured in a mounting 15 by means of a threaded bezel 16 and a yieldable ring 17. Projecting outwardly from the mounting 15 are four spaced lugs 18 which are adapted to cooperate with four correspondingly spaced recesses 19 formed in the top edge of the attaching ring 10. The locking ring 13 is provided with four correspondingly spaced notches 20 which are adapted to be selectively positioned above the recesses 19 as will hereinafter be explained.

In use, the locking ring 13 is turned so that the notches 20 are in register with the spaced recesses 19. The filter mounting 15, carrying any suitable color filter, is then dropped into place with the lugs 18 seated in the recesses 19. The locking ring 13 is then given a partial turn to the right whereupon the under side of the locking ring rides over the top faces of the lugs 18 and firmly locks the lugs in position since the locking ring 13 is threadedly secured to the attaching ring 10. The lugs 18 do not rest on the bottom of recesses 19, as shown in Figs. 6 and 7, but the under side of the mounting 15 bears on the shoulder of attaching ring 10 as shown at 21. Hence, when the locking ring is tightened, the lugs 18 yield slightly and so serve to insure a secure locking action.

To unlock the mounting, the locking ring 13 is merely turned to the left until the shoulder 22 of the locking ring 13 engages the stop screw 23. The filter mounting can then be lifted out and replaced with another.

From the foregoing it will be apparent that I am able to attain the objects of my invention and provide an improved means for detachably securing light modifying devices to a lens mounting. My device is simple in structure yet efficient in operation. The color filters or other devices can be easily and quickly inserted or removed and when in position they are firmly locked.

Although I have illustrated my invention as used for detachably securing color filters to a lens mounting, it is to be understood that my invention can be used equally well for the purpose of detachably securing auxiliary lenses or other light modifying devices or diaphragms to a lens mounting. An auxiliary lens element or any other device could, obviously, be mounted in mounting 15 or in a similar mounting. In case my invention is to be used for attaching an auxiliary lens to a camera lens, the regular lens barrel could be modified by providing it with the spaced recesses and the threaded locking ring so that the auxiliary lens could be detachably secured thereto. It is to be understood that the term "optical element", as used in the claims, refers to a color filter, lens, or any other device intended to modify or control the composition, quality or quantity of light. Various modifications can obviously be made without departing from the spirit of my invention.

I claim:

1. An article of the type described comprising a barrel having spaced recesses, a mounting having correspondingly spaced lugs cooperating with s: d recesses, an optical element carried by said mounting and a ring threaded to said barrel, said ring having an internal flange for locking said lugs in said recesses.

2. An attachment for camera lenses comprising an attaching ring having spaced recesses, a mounting having spaced lugs positioned in said recesses and a locking member threadedly secured to said attaching ring, said member having spaced notches adapted to be selectively positioned in register with said recesses and an internal flange adapted to contact said lugs.

3. An attachment for camera lenses comprising a barrel having a shoulder provided with spaced recesses, a mounting having radially extending lugs adapted to be positioned in said recesses, an optical element carried by said mounting, a locking ring threadedly secured to said barrel, said locking ring having spaced notches adapted to be selectively positioned in or out of registration with said lugs and a portion for contacting said lugs.

4. A device of the character described comprising a barrel having an internal shoulder, a mounting positioned within said barrel and resting on said shoulder, an optical element carried by said mounting, said barrel having spaced recesses, spaced, radial lugs on said mounting adapted to project partially into said recesses and a locking member threaded to said barrel, said member having spaced openings adapted to be selectively positioned in or out of registration with said lugs to unlock or lock said mounting relative to said barrel.

5. An attachment for camera lenses comprising a barrel having an internal shoulder, a mounting positioned within said barrel and resting on said shoulder, an optical element carried by said mounting, said barrel having spaced notches, said mounting having spaced projecting lugs adapted to be positioned in said notches, and a ring threaded to said barrel, said ring having an internal flange provided with spaced notches, said flange being adapted to contact with said lugs to lock said mounting in position.

OTTO E. TRAUTMANN.